(12) United States Patent
Ranganathan et al.

(10) Patent No.: US 7,880,496 B1
(45) Date of Patent: Feb. 1, 2011

(54) CONSERVATIVE LOGIC GATE FOR DESIGN OF QUANTUM DOT CELLULAR AUTOMATA CIRCUITS

(75) Inventors: Nagarajan Ranganathan, Tampa, FL (US); Himanshu Thapliyal, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 12/702,587

(22) Filed: Feb. 9, 2010

Related U.S. Application Data

(60) Provisional application No. 61/150,832, filed on Feb. 9, 2009.

(51) Int. Cl.
 H03K 19/195 (2006.01)
 H03K 19/173 (2006.01)
(52) U.S. Cl. .............................. 326/7; 326/37; 977/940
(58) Field of Classification Search ................... 326/1, 326/7, 37, 11, 35, 38, 104; 977/940
See application file for complete search history.

(56) References Cited

U.S. PATENT DOCUMENTS

| | | | |
|---|---|---|---|
| 5,710,436 | A | 1/1998 | Tanamoto et al. |
| 5,783,840 | A | 7/1998 | Randall et al. |
| 6,597,010 | B2 | 7/2003 | Eriksson et al. |
| 6,774,391 | B1 | 8/2004 | Cowburn |
| 7,602,207 | B2 * | 10/2009 | Tougaw et al. .................. 326/6 |

OTHER PUBLICATIONS

Tahoori, et al., Testing of Quantum Cellular Automata, IEEE Transactions on Nanotechnology, 2004, vol. 3, No. 4, pp. 432-442.
Ma, et al., Reversible Gates and Testability of One Dimensional Arrays of Molecular QCA, J Electron Test, 2008, vol. 24, pp. 297-311.
Momenzadeh, et al., Modeling QCA Defects at Molecular-Level in Combinational Circuits, 20th IEEE International Symposium on Defect and Fault Tolerance in VLSI Systems, Oct. 2005, Monterey, CA, pp. 208-216.
Wei, et al., Fault Tolerant Quantum Cellular Array (QCA) Design Using Triple Modular Redundancy with Shifted Operands, Proc. ASPDAC, Jun. 2005, Shanghai, China, pp. 1192-1195.
Gupta, et al., A Test Generation Framework for Quantum Cellular Automata Circuits, IEEE Transactions on VLSI Systems, Jan. 2007, vol. 15, No. 1, pp. 24-36.
Zhang, et al., A Method of Majority Logic Reduction for Quantum Cellular Automata, IEEE Transactions on Nanotechnology, Dec. 2004, vol. 3, No. 4, pp. 443-450.
Toffoli, Reversible Computing, Automata, Languages, and Programming, Springer-Verlag, 1980, pp. 632-644.

(Continued)

*Primary Examiner*—Daniel D Chang
(74) *Attorney, Agent, or Firm*—Courtney M. Dunn; Smith & Hopen, P.A.

(57) ABSTRACT

A novel conservative gate especially suiting a Quantum Dot Cellular Automata (QCA) majority voter-based design. The input-to-output mapping of the novel conservative QCA (CQCA) gate is: P=A; Q=AB+BC+AC [MV(A,B,C)]; R=A'B+A'C+BC [MV(A',B,C)], where A, B, C are inputs and P, Q, R are outputs, respectively. A method of transferring information in a quantum-dot cellular automata device is also provided.

13 Claims, 8 Drawing Sheets

OTHER PUBLICATIONS

Momenzadeh, et al., Characterization, Test, and Logic Synthesis of And-Or-Inverter (AOI) Gate Design for QCA Implementation, IEEE Transactions on Computer-Aided Design of Integrated Circuits and Systems, Dec. 2005, vol. 24, No. 12, pp. 1881-1893.

Yadavalli, et al., Fanout Gate in Quantum-Dot Cellular Automata, Nanotechnology, 2007, vol. 18, pp. 1-4.

Imre, et al., Majority Logic Gate for Magnetic Quantum-Dot Cellular Automata, Science, 2006, vol. 311, pp. 205-208.

Fredkin, et al, Conservative Logic, International Journal of Theoretical Physics, 1982, vol. 21, Nos. 3-4, pp. 219-253.

Brum, et al., Coupled Quantum Dots as Quantum Exclusive-OR Gate, Superlattices and Microstructures, 1997, vol. 22, No. 3, pp. 431-436.

Tougaw, et al., Logical Devices Implemented Using Quantum Cellular Automata, J. Appl. Phys., 1994, vol. 75, No. 3, pp. 1818-1825.

Kompa, et al., A Molecular Logic Gate, PNAS, 2001, vol. 98, No. 2, pp. 410-414.

Sleator, et al., Realizable Universal Quantum Logic Gates, Physical Review Letters, 1995, vol. 74, No. 20, pp. 4087-4090.

\* cited by examiner

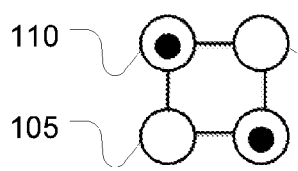
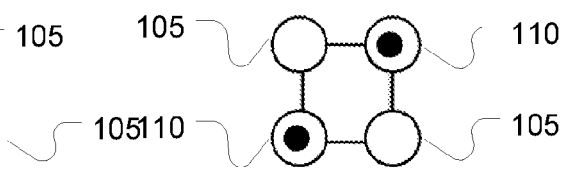
FIG. 1A                    FIG. 1B
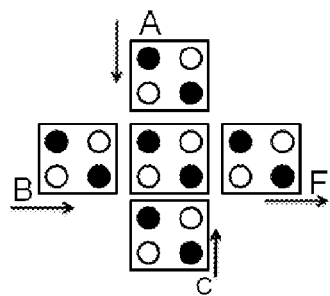
FIG. 2
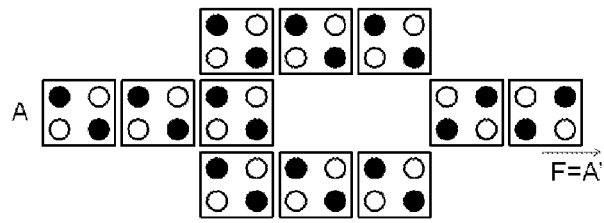
FIG. 3
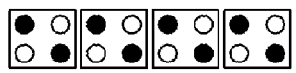                    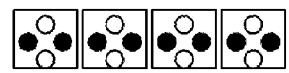
FIG. 4                                   FIG. 5

| Input | | | Output | | |
|---|---|---|---|---|---|
| A | B | C | P | Q | R |
| 0 | 0 | 0 | 0 | 0 | 0 |
| 0 | 0 | 1 | 0 | 0 | 1 |
| 0 | 1 | 0 | 0 | 0 | 1 |
| 0 | 1 | 1 | 0 | 1 | 1 |
| 1 | 0 | 0 | 1 | 0 | 0 |
| 1 | 0 | 1 | 1 | 1 | 0 |
| 1 | 1 | 0 | 1 | 1 | 0 |
| 1 | 1 | 1 | 1 | 1 | 1 |

| Input Vector | Fault Free | Fault Patterns ||||||||
|---|---|---|---|---|---|---|---|---|---|
| | | 1 | 2 | 3 | 4 | 5 | 6 | 7 | 8 |
| a0 | a0 | a0 | a0 | a0 | a0 | a0 | a2 | a0 | a0 |
| a1 | a1 | a3 | a0 | a3 | a1 | a1 | a1 | a0 | a0 |
| a2 | a1 | a3 | a0 | a1 | a3 | a3 | a3 | a1 | a1 |
| a3 | a3 | a3 | a3 | a1 | a1 | a3 | a3 | a3 | a2 |
| a4 | a4 | a4 | a4 | a6 | a6 | a4 | a4 | a4 | a5 |
| a5 | a6 | a4 | a7 | a6 | a4 | a4 | a4 | a6 | a6 |
| a6 | a6 | a4 | a7 | a4 | a6 | a6 | a6 | a7 | a7 |
| a7 | a7 | a7 | a7 | a7 | a7 | a7 | a5 | a7 | a7 |

FIG. 13

| | Fredkin | CQCA |
|---|---|---|
| Clk Zs | 4 | 2 |
| MVs | 6 | 2 |
| Total Cells | 246 | 117 |
| Area | 0.37um$^2$, where L=0.4812um and W= 0.76984um | 0.11um$^2$, where L=0.30012 um W= 0.36454um |

FIG. 14

|    | Standard Function | Fredkin Implementation | | | CQCA Implementation | | |
| --- | --- | --- | --- | --- | --- | --- | --- |
|    |    | # of Fredkin | # of MVs | Clk Zs | # of CQCA | # of MVs | Clk Zs |
| 1  | F=ABC | 2 | 12 | 8 | 2 | 4 | 4 |
| 2  | F=AB | 1 | 6 | 4 | 1 | 2 | 2 |
| 3  | F=ABC+AB'C' | 3 | 18 | 12 | 3 | 6 | 4 |
| 4  | F=ABC+A'B'C' | 4 | 24 | 12 | 6 | 12 | 8 |
| 5  | F=AB+BC | 2 | 12 | 8 | 2 | 4 | 4 |
| 6  | F=AB+A'B'C | 5 | 30 | 16 | 5 | 10 | 8 |
| 7  | F=ABC+A'BC'+AB'C' | 6 | 36 | 16 | 6 | 12 | 6 |
| 8  | F=A | 1 | 6 | 4 | 1 | 2 | 2 |
| 9  | F=AB+BC+AC | 5 | 30 | 16 | 1 | 2 | 2 |
| 10 | F=AB+B'C | 1 | 6 | 4 | 3 | 6 | 4 |
| 11 | F=AB+BC+A'B'C' | 6 | 36 | 16 | 6 | 12 | 8 |
| 12 | F=AB+A'B' | 2 | 12 | 8 | 4 | 8 | 6 |
| 13 | F=ABC+A'B'C+AB'C'+A'BC' | 3 | 18 | 12 | 3 | 6 | 4 |
|    | Total | 41 | 246 | 136 | 43 | 86 | 62 |

*FIG. 15*

CONSERVATIVE LOGIC GATE FOR DESIGN OF QUANTUM DOT CELLULAR AUTOMATA CIRCUITS

CROSS REFERENCE TO RELATED APPLICATIONS

This application claims priority to currently U.S. Provisional Patent Application 61/150,832, entitled, "Conservative Logic Gate for Design of Quantum Dot Cellular Automata Circuits", filed Feb. 9, 2009, the entire contents of which are hereby incorporated by reference.

FIELD OF INVENTION

This invention relates to nanocircuits; more specifically, the design of a quantum dot cellular automata (QCA) device and method.

BACKGROUND

The existing CMOS technology is reaching its limits beyond which the down-scaling in feature size and proper working of the device is becoming extremely difficult. CMOS devices suffer from heat generation as they have to discharge all the stored energy when flipping from 1 to 0. Quantum dot cellular automata (QCA) is one of the emerging nanotechnologies in which it is possible to achieve circuit densities and clock frequencies much beyond the limit of existing CMOS technology. QCA has significant advantages in terms of power dissipation as it does not have to dissipate all its signal energy hence the reason it is considered as one of the promising technologies to achieve the thermodynamic limit of computation.

QCA attempts to create general computational functionality at the nanoscale by controlling the position of single electrons. The fundamental unit of QCA is the QCA cell, or set of cells each of which is comprised of several quantum dots. FIG. 1A shows a cell 100 created with four quantum dots 105 positioned at the vertices of a square. The bounding box shown around the cell 100 is used only to identify one cell from another and does not represent any physical system. Two of the quantum dots 105 are electron containing dots 110.

These QCA cells can be controlled by clock signals to ignore their environment when relaxing or in a relaxed state, to respond to their environment when they are in the process of locking into a state, and to be independent of their environment, and maintain a given state when they are in a locked state that prevents quantum tunneling. When the cells are responding to their environment, they tend to align in one of two directions, as shown in FIG. 1A and FIG. 1B, and this bistable behavior can be used to encode a binary signal by assigning a "0" to one of the states, such as the state shown in FIG. 1A and a "1" to the other state, as shown in FIG. 1B. A cell also tends to align in the same direction as those cells surrounding it.

There are fourth basic QCA logic devices, which are shown in FIGS. 2 through 5. FIG. 2 shows a majority voter (MV) which takes three inputs A, B, and C and determines a logical majority according to the equation F=AB+AC+BC. FIG. 3 shows an inverter (INV), which inverts input A to give an output F=A'. FIG. 4 shows a binary wire and FIG. 5 shows an inverter chain.

The Launder four-phase clocking scheme is generally used in QCA design. Due to significant error rates in nano-scale manufacturing, nanotechnologies including QCA require an extremely low device error rate. In manufacturing QCA, defects can occur in the synthesis and deposition phases. However, defects are more likely to take place during the deposition phase. Researchers assume that QCA cells have no manufacturing defects and, in metal, QCA faults occur due to cell misplacement. These defects can be characterized as cell displacement, cell misalignment, and cell omission. Researchers have proved that molecular QCA cells are more susceptible to missing/additional QCA cell defects. Additional cell defect is due to the deposition of an additional cell on the substrate while missing cell defect is due to loss of a particular cell. QCA devices are also prone to transient faults caused by thermodynamic effects, radiation, and other effects, as the energy difference between the ground and the excited state is small. Thus, researchers have used novel concepts, such as reversible logic, to improve the testability of molecular QCA.

The testing of QCA was addressed for the first time in a seminal work by M. B. Tahoori et al. M. B. Tahoori, J. Huang, M. Momenzadeh, and F. Lombardi, "Testing of Quantum Cellular Automata," IEEE Trans. Nanotechnol., vol. 3, no. 4, pp. 432-442, December 2004. In Tahoori et al., the defect characterization of QCA devices is investigated and is shown how the testing of QCA differs from conventional CMOS. In M. Momenzadeh et al., the modeling of QCA defects at molecular level is done for combinational circuits. M. Momenzadeh, M. Ottavi, F. Lombardi, "Modeling QCA defects at molecular level in combinational circuits", Proc. DFT in VLSI Systems, Monterey, Calif., USA, 3-5 October 2005, pp. 208-216. Fault characterization is done for single missing/additional cell defect on different QCA devices such as MV, INV, fan-out, crosswire and L-shape wire. In P. Gupta, et al., test generation framework for QCA is presented. P. Gupta, N. K. Jha, L. Lingappan, "A Test Generation Framework for Quantum Cellular Automata Circuits", IEEE Trans. VLSI Syst., Vol. 15, no. 1, pp. 24-36 (January 2007). It is seen that additional test vectors can be generated for detecting QCA defects, which remain undetected by stuck-at fault model. Bridging fault on QCA wires is also addressed. In X. Ma et al., reversible logic is used to detect single missing/additional cell defects. X. Ma, J. Huang, C. Metra, F. Lombardi, "Reversible Gates and Testability of One Dimensional Arrays of Molecular QCA", Springer Journal of Electronic Testing, vol. 24, no. 1-3, pp. 297-311 (June, 2008). It is seen that reversible one-dimensional array is C-testable. In T. Wei et al., fault-tolerant QCA designs are presented using triple modular redundancy with shifted operands. The strategy is proposed considering the wire delay and faults in wires in QCA. T. Wei, K. Wu, R. Karri, and A. Orailoglu, "Fault Tolerant Quantum Cellular Array (QCA) Design Using Triple Modular Redundancy with Shifted Operands", Proc. ASP-DAC 2005, Shanghai, China, pp. 1192-1195 (January 2005).

There is an existing popular conservative gate called the Fredkin gate. A block diagram of the Fredkin gate is shown in FIG. 6. The Fredkin gate can be described as mapping (A, B, C) to (P=A, Q=A'B+AC, R=AB+A'C), where A, B, C are input and P, Q, R are output, respectively. The Fredkin gate produces the same number of ones (1's) on the output as were put on the input.

The QCA design of the Fredkin gate is shown in the circuit diagram of FIG. 7. The Fredkin gate has a two-level majority voter (MV) implementation and it requires six majority voters (majority gates). As shown in FIG. 7, the Fredkin gate also requires two inverters and has a four-phase clocking scheme. Inputs A, B, and C are taken into the circuit at clock zone zero (D0), the first set of majority voters are in clock zone one (D1), the outputs of the first set of majority voters are in clock zone two (D2), and the second set of majority voter are in clock zone three (D3). The QCA layout of the Fredkin gate is shown in FIG. 8.

SUMMARY

A conservative quantum-dot cellular automata (CQCA) device, according to an embodiment of the present invention, includes three substantially parallel lines of rotated cells and seven lines of normal cells positioned substantially orthogonal to the three lines of rotated cells. The first line of normal cells includes a leading normal cell displaced a half-cell length from the remainder of the first line of normal cells. The leading normal cell is positioned adjacent to the first line of rotated cells at two connector cells. The first line of normal cells also includes a trailing normal cell positioned adjacent to an input of a first majority voter.

The second line of normal cells also includes a leading normal cell displaced a half-cell length from the remainder of the second line of normal cells. The leading normal cell is positioned adjacent to the second line of rotated cells at two connector cells. The second line of normal cells also includes a trailing normal cell positioned adjacent to a second input of the first majority voter.

The third line of normal cells also includes a leading normal cell displaced a half-cell length from the remainder of the third line of normal cells. The leading normal cell is positioned adjacent to the third line of rotated cells at two connector cells. The third line of normal cells also includes a trailing normal cell positioned adjacent to a third input of the first majority voter.

The fourth line of normal cells includes a leading normal cell displaced a half-cell length from the remainder of the fourth line of normal cells. The leading normal cell is positioned adjacent to the first line of rotated cells at two additional connector cells. The fourth line of normal cells also includes a trailing normal cell positioned adjacent to an input of a second majority voter.

The fifth line of normal cells also includes a leading normal cell displaced a half-cell length from the remainder of the fifth line of normal cells. The leading normal cell is positioned adjacent to the second line of rotated cells at two additional connector cells. The fifth line of normal cells also includes a trailing normal cell positioned adjacent to a second input of the second majority voter.

The sixth line of normal cells also includes a leading normal cell displaced a half-cell length from the remainder of the sixth line of normal cells. The leading normal cell is positioned adjacent to the third line of rotated cells at two additional connector cells. The fifth line of normal cells also includes a trailing normal cell positioned adjacent to a third input of the second majority voter.

The seventh line of normal cells also includes a leading normal cell displaced a half-cell length from the remainder of the seventh line of normal cells. The leading normal cell is positioned adjacent to the first line of rotated cells at two additional connector cells.

In another embodiment, the CQCA device further includes a first clock controlling the first, second, and third lines of rotated cells. The CQCA device may further include a second clock controlling the two majority voters.

The first line of normal cells may be connected to the second line of rotated cells at a first common cell and connected to the third line of rotated cells at a second common cell. The second line of normal cells may be connected to the third line of rotated cells at a third common cell. The fourth line of normal cells may be connected to the second line of rotated cells at a fourth common cell and to the third line of rotated cells at a fifth common cell. The fifth line of normal cells may be connected to the third line of rotated cells at a sixth common cell.

A method of transferring information in a CQCA device, according to an embodiment of the present invention, includes applying a first input state to the first line of rotated cells, applying a second input state to the second line of rotated cells, and applying a third input state to the third line of rotated cells. The method further includes transferring the first input state to the first line of normal cells, transferring the second input state to the second line of normal cells, and transferring the third input state to the third line of normal cells, wherein the transferring is controlled by the first clock. The method also includes transferring the inversion of the first input state to the fourth line of normal cells, transferring the second input state to the fifth line of normal cells, transferring the third input state to the sixth line of normal cells, and transferring the first input state to the seventh line of normal cells, wherein the transferring is also controlled by the first clock. In addition, the method includes logically determining a majority of the first, second, and third input states using the first majority voter and logically determining a majority of the inversion of the first input state and the second and third input states using the second majority voter, wherein both majority voter are controlled by the second clock.

The method may further include expressing the logical majority of the first input state, the second input state, and the third input state at first output region.

The method may also include expressing the logical majority of the inversion of the first input state, the second input state, and the third input state at a second output region.

The method may also include expressing the first input state at a third output region.

In an additional embodiment, a CQCA device includes a first circuit input (A), a second circuit input (B), and a third circuit input (C) controlled by a first clock. The CQCA device also includes an inverter having an input connected to the first circuit input (A) and an output. In addition, the CQCA device includes two majority voters, both controlled by a second clock. The first majority voter has its first input connected to the output of the inverter, its second input connected to the second circuit input (B), and its third input connected to the third circuit input (C). The second majority voter has its first input connected to the first circuit input (A), its second input connected to the second circuit input (B), and its third input connected to the third circuit input (C).

In a further embodiment, a method of transferring information in a CQCA device includes applying a first input state to the first circuit input, applying a second input state to the second circuit input, and applying a third input state to the third circuit input, wherein each circuit input is controlled by a first clock. The method further includes inverting the first input state using the inverter to create an inverted first input state. Then, the method logically determines a majority of the inverted first input state, the second input state, and the third input state using the first majority voter, which is controlled by a second clock. The method also logically determines a majority of the first, second, and third input states using the second majority voter, which is also controlled by the second clock.

BRIEF DESCRIPTION OF THE DRAWINGS

For a fuller understanding of the invention, reference should be made to the following detailed description, taken in connection with the accompanying drawings, in which:

FIG. 1A is a diagram of a QCA cell, representing a logic "0".

FIG. 1B is a diagram of a QCA cell, representing a logic "1".

FIG. 2 is a diagram of a QCA majority voter.

FIG. 3 is a diagram of a QCA inverter.

FIG. 4 is a diagram of a QCA binary wire.

FIG. 5 is a diagram of a QCA inverter chain.

FIG. 13 is a table summarizing the fault patterns in the CQCA gate in accordance with an embodiment of the present invention.

FIG. 14 is a table comparing the Fredkin gate of the prior art and the CQCA of the present invention.

FIG. 15 is a table showing a synthesis comparison of thirteen standard functions in the Fredkin and CQCA implementations.

DETAILED DESCRIPTION OF THE PREFERRED EMBODIMENT

In the following detailed description of the preferred embodiments, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

The present invention lays the foundation of concurrent testing of quantum-dot cellular automata (QCA) computing, which is susceptible to high error rates. Conservative logic gates have equal number of ones (1's) in the output as on the input. Thus, they are parity preserving; that is, the parity of the input is always equal to the parity of the output. As molecular QCA is based on majority voting, the design based on conservative logic will be completely different from conventional CMOS designs.

Figure 6:
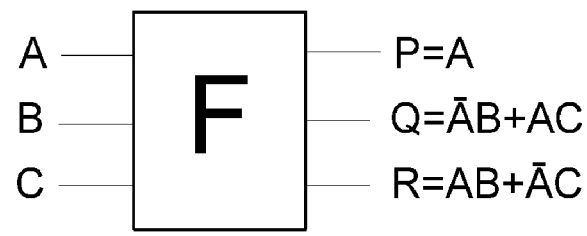
FIG. 6 is a block diagram of the Fredkin gate of the prior art.
Figure 7:
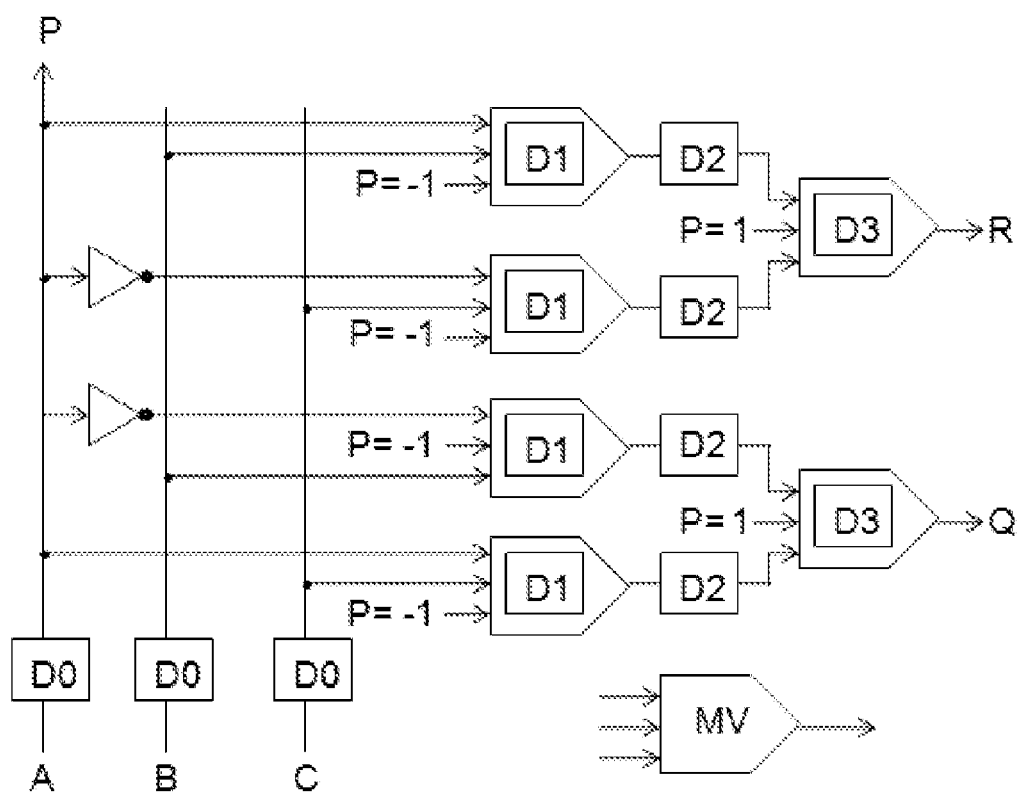
FIG. 7 is a circuit diagram of the QCA design of the Fredkin gate of the prior art, in which D0 to D3 represent clock zones 0 to 3.
Figure 8:
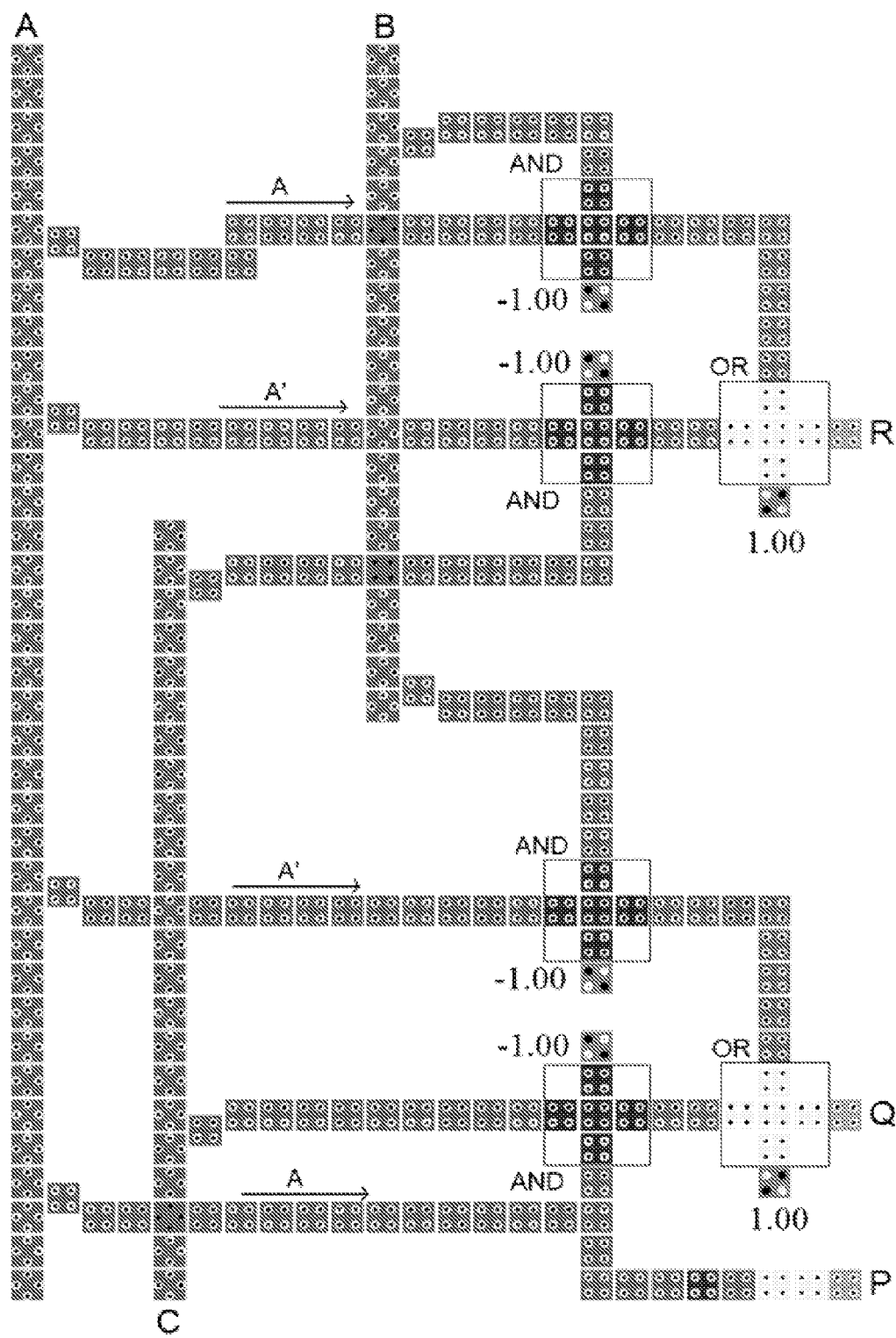
FIG. 8 is a diagram of the QCA layout of the Fredkin gate of the prior art.

The existing conservative Fredkin gate (shown in FIGS. 6, 7, and 8) is not suitable for all QCA designs, because it is costly in molecular QCA implementation. The Fredkin gate requires four clocking zones and six majority voters. The design of an embodiment of the present invention, or conservative QCA (CQCA), requires only two clocking zones and two majority voters. CQCA also requires less area and exhibits less delay than the Fredkin gate.

Figures 9, 10:
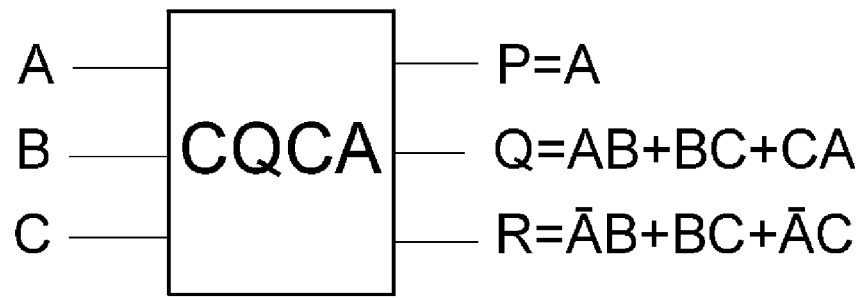
FIG. 9 is a block diagram of the conservative QCA (CQCA) gate in accordance with an embodiment of the present invention.
FIG. 10 is a truth table of the CQCA gate in accordance with an embodiment of the present invention.

FIG. 9 shows a block diagram of the CQCA gate in accordance with an embodiment of the present invention. As shown, the input to output mapping of the CQCA gate is: P=A; Q=AB+BC+AC [MV(A,B,C)]; R=A'B+A'C+BC [MV(A',B,C)], where A, B, C are input and P, Q, R are output, respectively. FIG. 10 shows the truth table of the CQCA gate.

As shown in the truth table, the CQCA gate produces the same number of ones (1's) on the output as were used in the input.

Figure 11:
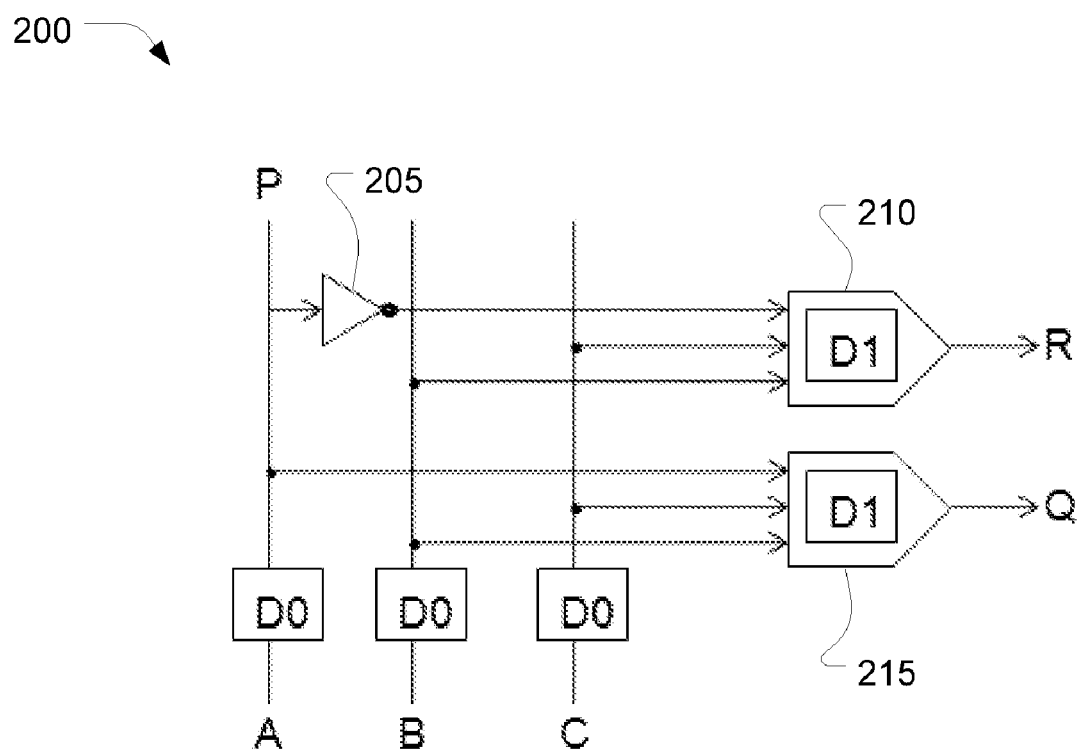
FIG. 11 is a circuit diagram of the QCA design of the CQCA gate in accordance with an embodiment of the present invention.

FIG. 11 is a circuit diagram of the QCA implementation of the CQCA gate. As can be seen from the circuit diagram, CQCA gate 200 can be implemented with one-level majority voter logic and requires only two majority voters to implement. CQCA gate 200 includes inverter 205, majority voter 210, and majority voter 215. CQCA gate has three circuit inputs—first circuit input A, second circuit input B, and third circuit input C. Circuit inputs A, B, and C are all controlled by a first clock, indicated as D0. Inverter 205 inverts the input state of circuit input A, which is then fed as one of the inputs to majority voter 210. The input states of circuit input B and circuit input C are used as the remaining two inputs to majority voter 210. Majority voter 210 is controlled by a second clock, indicated as D1, and produces an output R (R=A'B+BC+CA). Majority voter 215 receives as input the input states of circuit inputs A, B, and C and is also controlled by the second clock (D1). Majority voter 215 produces an output Q (Q=AB+BC+CA). CQCA gate 200 also has a third output P (P=A).

Figure 12:
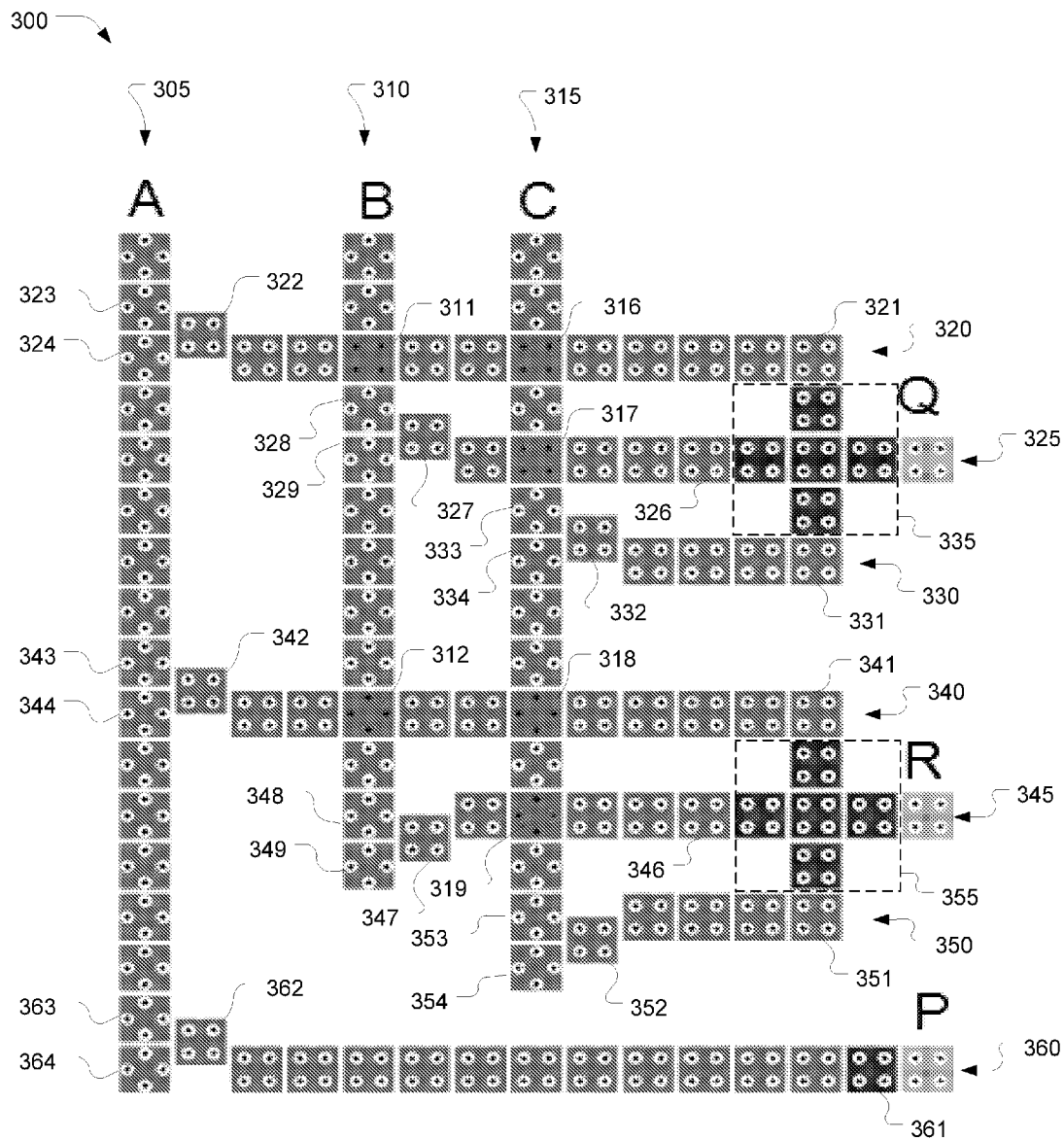
FIG. 12 is a diagram of the QCA layout of the CQCA gate in accordance with an embodiment of the present invention.

An embodiment of the QCA layout of CQCA device 300 is illustrated in FIG. 12. CQCA device 300 accepts three inputs applied to the input cells labeled A, B, and C. Each of input cells A, B, and C is a member of a line of normal cells under the control of a common clock, i.e. A is an input cell to line of rotated cells 305 that is under the control of a first clock, B is an input cell to line of rotated cells 310 that is also under the control of the first clock, and C is an input cell to line of rotated cells 315 that is also under the control of the first clock. A rotated cell is a square cell in which each of the quantum dots is situated near the mid-point of a side of the square cell, as opposed to a normal cell in which each of the quantum dots is situated at a corner of the square cell. Line of rotated cells 305, line of rotated cells 310, and line of rotated cells 315 are arranged substantially parallel to each other.

CQCA device 300 also includes line of normal cells 320, which is arranged substantially orthogonal to line of rotated cells 305. Line of normal cells 320 includes leading normal cell 322, which is displaced a half-cell length from the remainder of line of normal cells 320. Leading normal cell 322 is positioned adjacent to line of rotated cells 305 at two connector cells 323, 324. Line of normal cells 320 is also arranged substantially orthogonal to line of rotated cells 310 and line of rotated cells 315. Line of normal cells 320 connects to line of rotated cells 310 at common cell 311 and to line of rotated cells 315 at common cell 316. Line of normal cells 320 also includes trailing normal cell 321, which is positioned adjacent to one of three inputs of majority voter 335.

In addition, CQCA device 300 includes line of normal cells 325, which is arranged substantially orthogonal to line of rotated cells 310. Line of normal cells 325 includes leading normal cell 327, which is displaced a half-cell length from the remainder of line of normal cells 325. Leading normal cell 327 is positioned adjacent to line of rotated cells 310 at two connector cells 328, 329. Line of normal cells 325 is also arranged substantially orthogonal to line of rotated cells 315. Line of normal cells 325 connects to line of rotated cells 315 at common cell 317. Line of normal cells 325 also includes trailing normal cell 326, which is positioned adjacent to a second input of majority voter 335.

CQCA device 300 further includes line of normal cells 330, which is arranged substantially orthogonal to line of rotated cells 315. Line of normal cells 330 includes leading normal cell 332, which is displaced a half-cell length from the remainder of line of normal cells 330. Leading normal cell 332 is positioned adjacent to line of rotated cells 315 at two connector cells 333, 334. Line of normal cells 330 also includes trailing normal cell 331, which is positioned adjacent to a third input of majority voter 335.

Majority voter 335 is controlled by a second clock and has an output positioned adjacent to output cell Q.

CQCA device 300 also includes line of normal cells 340, which is arranged substantially orthogonal to line of rotated cells 305. Line of normal cells 340 includes leading normal cell 342, which is displaced a half-cell length from the remainder of line of normal cells 340. Leading normal cell 342 is positioned adjacent to line of rotated cells 305 at two connector cells 343, 344. Line of normal cells 340 is also arranged substantially orthogonal to line of rotated cells 310 and line of rotated cells 315. Line of normal cells 340 connects to line of rotated cells 310 at common cell 312 and to line of rotated cells 315 at common cell 318. Line of normal cells 340 also includes trailing normal cell 341, which is positioned adjacent to one of three inputs of majority voter 355.

In addition, CQCA device 300 includes line of normal cells 345, which is arranged substantially orthogonal to line of rotated cells 310. Line of normal cells 345 includes leading normal cell 347, which is displaced a half-cell length from the remainder of line of normal cells 345. Leading normal cell 347 is positioned adjacent to line of rotated cells 310 at two connector cells 348, 349. Line of normal cells 345 is also arranged substantially orthogonal to line of rotated cells 315. Line of normal cells 345 connects to line of rotated cells 315 at common cell 319. Line of normal cells 345 also includes trailing normal cell 346, which is positioned adjacent to a second input of majority voter 355.

CQCA device 300 further includes line of normal cells 350, which is arranged substantially orthogonal to line of rotated cells 315. Line of normal cells 350 includes leading normal cell 352, which is displaced a half-cell length from the remainder of line of normal cells 350. Leading normal cell 352 is positioned adjacent to line of rotated cells 315 at two connector cells 353, 354. Line of normal cells 350 also includes trailing normal cell 351, which is positioned adjacent to a third input of majority voter 355.

Majority voter 355 is controlled by the same clock as majority voter 335, second clock, and has an output positioned adjacent to output cell R.

CQCA device 300 also includes line of normal cells 360, which is arranged substantially orthogonal to line of rotated cells 305. Line of normal cells 360 includes leading normal cell 362, which is displaced a half-cell length from the remainder of line of normal cells 360. Leading normal cell 362 is positioned adjacent to line of rotated cells 305 at two connector cells 363, 364. Line of normal cells 360 also includes trailing normal cell 361, which is positioned adjacent to output cell P.

When an input state is applied to input cell A, at the first clock signal, the input propagates along line of rotated cells 305 and transfers to line of normal cells 320, where it then propagates to trailing normal cell 321. Similarly, when an input state is applied to input cell B, at the first clock signal, the input propagates along line of rotated cells 310 and transfers to line of normal cells 325, where it then propagates to trailing normal cell 326. Likewise, when an input state is applied to input cell C, at the first clock signal, the input propagates along line of rotated cells 315 and transfers to line of normal cells 330, where it then propagates to trailing normal cell 331. At the second clock signal, the states on each trailing normal cell 321, 326, and 331 are taken as input to majority voter 335, which determines a logical majority of the three states and outputs the resulting state to output cell Q.

When an input state is applied to input cell A, it also propagates further down line of rotated cell 305 and transfers to line of normal cells 340. However, during this transfer the input state is inverted such that the inversion of the input state applied at input cell A is propagated along line of normal cells 340. This inversion is caused by the placement of leading cell 342 along line of rotated cells 305. The inverted input then propagates to trailing normal cell 341. When an input state is applied to input cell B, it also propagates further down line of rotated cells 310 and transfers to line of normal cells 345, where it propagates to trailing normal cell 346. Similarly, when an input state is applied to input cell C, it also propagates further down line of rotated cells 315 to line of normal cells 350, where it propagates to trailing normal cell 351. At the second clock signal, the states on each trailing normal cell 341, 346, and 351 are taken as input to majority voter 355, which determines the logical majority of the three states and outputs the resulting state to output cell R.

In addition, when an input state is applied to input cell A, it also propagates further down line of rotated cell 305 and transfers to line of normal cells 360, where it propagates to trailing normal cell 361. At the second clock signal, the state is transferred to output cell P.

To demonstrate the effectiveness of Fredkin and CQCA gates for concurrently testable QCA design, a fault pattern study was performed on the Fredkin and CQCA gates due to a single missing/additional cell defect in QCA computing. The QCA layouts of the Fredkin gate (shown in FIG. 8) and the CQCA gate (shown in FIG. 12) are independent of the technology in which QCA is implemented and are, thus, generic in nature. The Fredkin and CQCA gates QCA layouts were modeled, with the presence of all possible single missing/additional cell defects in MV, INV, fan-out, crosswire and L-shape wire. The modeling was done using HDLQ, a design tool that provides the Verilog HDL library of QCA devices, i.e., MV, INV, fan-out, crosswire, L-shape wire with fault injection capability. The design was simulated in Verilog HDL simulator in the presence of faults to determine the corresponding output.

The testing of the Fredkin and CQCA gates with eight input patterns and all possible single missing/additional cell defects was done using the Active HDL simulator. The testing for the Fredkin gate generated twenty unique fault patterns. The testing of CQCA generated eight unique fault patterns as shown in the table in FIG. 13. In FIG. 13, ai is the three-bit pattern having an equivalent decimal value of i, for example a0 represents 000 (decimal 0) and a7 represents 111 (decimal 7). Each fault pattern was observed. It was found that, in the occurrence of a fault, there is a parity mismatch between the output and the input of the Fredkin and CQCA gates (i.e., parity of the input vector is not equal to the output vector). Therefore, the Fredkin and CQCA gates can detect concurrently permanent fault by matching the parity. Because the Fredkin and CQCA gates are logically parity preserving, they can also detect the transient faults. Hence, the Fredkin and CQCA gates can concurrently detect permanent and transient fault based on parity preserving in molecular QCA. In CMOS circuits, parity match is checked as $A \oplus B \oplus C = P \oplus Q \oplus R$. However, implementing the XOR gate in QCA is costly as the process requires three majority voters. In QCA, implementing $A \oplus B \oplus C$ would require six majority voters and similarly $P \oplus Q \oplus R$ would require six majority voters. Thus, comparing $A \oplus B \oplus C = P \oplus Q \oplus R$ would require a total of twelve majority voters.

The table in FIG. 14 shows the comparison between the Fredkin and CQCA gates. Because the number of clocking zones required to design the CQCA gate is less, it will be faster than the Fredkin gate. The total number of QCA cells required in the CQCA gate is only 47% of the cells required by the Fredkin gate and the area occupied by the CQCA gate is only 29% of the area occupied by the Fredkin gate (the Fredkin gate requires 246 QCA cells with an area of 0.37 um$^2$ while the CQCA gate requires 117 QCA cells with an area of 0.11 um$^2$). Thus, the CQCA gate of the present invention surpasses the Fredkin gate in all aspects.

The designs were verified using QCADesigner (version 2.0.3). In the bi-stable approximation, the following parameters were used:
- cell size=18 nm,
- number of samples=182800,
- convergence tolerance=0.001000,
- radius of effect=41 nm,
- relative permittivity=12.9,
- clock high=9.8e-22,
- clock low=3.8e-23,
- clock amplitude factor=2.000,
- layer separation=11.5000 nm,
- maximum iterations per sample=1000.

In order to compare the Fredkin and the CQCA gates for logic synthesis, thirteen standard three-variable Boolean combinational functions proposed in R. Zhang et al., for molecular QCA were implemented. R. Zhang, K. Walus, W. Wang, and G. A. Jullien, "A method of majority logic reduction for quantum cellular automata," IEEE Trans. Nanotechnol., vol. 3, no. 4, pp. 443-450 (December 2004). These thirteen functions cover all of the 256 Boolean functions for three variables. The table in FIG. 15 shows the comparison between the two by synthesizing these thirteen standard functions. It requires a total of 246 majority voters and 136 clock zones to implement the standard functions using the Fredkin gate. While it requires only 86 majority voters and 62 clock zones when these standard functions are implemented with the CQCA gate. Therefore, implementing with CQCA achieves a reduction of 65% in terms of majority voters and 54.4% in terms of clock zones.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall there between.

What is claimed is:

1. A conservative quantum-dot cellular automata device, comprising:
    a first line of rotated cells;
    a second line of rotated cells arranged substantially parallel to said first line of rotated cells;
    a third line of rotated cell arranged substantially parallel to said first line of rotated cells and said second line of rotated cells;
    a first line of normal cells arranged substantially orthogonal to said first line of rotated cells and having a first leading normal cell displaced a half-cell length from the remainder of said first line of normal cells, said first leading normal cell positioned adjacent to said first line of rotated cells at a first connector cell of said first line of rotated cells and a second connector cell of said first line of rotated cells;
    said first line of normal cells having a trailing normal cell positioned adjacent to a first input of a first majority voter;
    a second line of normal cells arranged substantially orthogonal to said second line of rotated cells and having a second leading normal cell displaced a half-cell length from the remainder of said second line of normal cells, said second leading normal cell positioned adjacent to said second line of rotated cells at a third connector cell of said second line of rotated cells and a fourth connector cell of said second line of rotated cells;
    said second line of normal cells having a trailing normal cell positioned adjacent to a second input of said first majority voter;
    a third line of normal cells arranged substantially orthogonal to said third line of rotated cells and having a third leading normal cell displaced a half-cell length from the remainder of said third line of normal cells, said third leading normal cell positioned adjacent to said third line of rotated cells at a fifth connector cell of said third line of rotated cells and a sixth connector cell of said third line of rotated cells;
    said third line of normal cells having a trailing normal cell positioned adjacent to a third input of the first majority voter;
    a fourth line of normal cells arranged substantially orthogonal to said first line of rotated cells and having a fourth leading normal cell displaced a half-cell length from the remainder of said fourth line of normal cells, said fourth leading normal cell positioned adjacent to said first line of rotated cells at a seventh connector cell of said first line of rotated cells and an eighth connector cell of said first line of rotated cells;
    said fourth line of normal cells having a trailing normal cell positioned adjacent to a first input of a second majority voter;
    a fifth line of normal cells arranged substantially orthogonal to said second line of rotated cells and having a fifth leading normal cell displaced a half-cell length from the remainder of said fifth line of normal cells, said fifth leading normal cell positioned adjacent to said second line of rotated cells at a ninth connector cell of said second line of rotated cells and a tenth connector cell of said second line of rotated cells;
    said fifth line of normal cells having a trailing normal cell positioned adjacent to a second input of said second majority voter;
    a sixth line of normal cells arranged substantially orthogonal to said third line of rotated cells and having a sixth leading normal cell displaced a half-cell length from the remainder of said sixth line of normal cells, said sixth leading normal cell positioned adjacent to said third line of rotated cells at an eleventh connector cell of said third line of rotated cells and a twelfth connector cell of said third line of rotated cells;
    said sixth line of normal cells having a trailing normal cell positioned adjacent to a third input of said second majority voter; and
    a seventh line of normal cells arranged substantially orthogonal to said first line of rotated cells and having a seventh leading normal cell displaced a half cell length from the remainder of said seventh line of normal cells, said seventh leading normal cell positioned adjacent to said second line of rotated cells at a thirteenth connector cell of said first line of rotated cells and fourteenth connector cell of said first line of rotated cells.

2. The conservative quantum-dot cellular automata device of the claim 1, further comprising:
said first line of rotated cells controlled by a first clock;
said second line of rotated cells controlled by said first clock; and
said third line of rotated cell controlled by said first clock.

3. The conservative quantum-dot cellular automata device of the claim 1, further comprising:
said first majority voter controlled by a second clock; and
said second majority voter controlled by said second clock.

4. The conservative quantum-dot cellular automata device of the claim 1, further comprising:
said first line of normal cells arranged substantially orthogonal to said second and third lines of rotated cells and connected to said second line of rotated cells at a first common cell and connected to said third line of rotated cells at a second common cell.

5. The conservative quantum-dot cellular automata device of the claim 1, further comprising:
said second line of normal cells arranged substantially orthogonal to said third line of rotated cells and connected to said third line of rotated cells at a third common cell.

6. The conservative quantum-dot cellular automata device of the claim 1, further comprising:
said fourth line of normal cells arranged substantially orthogonal to said second and third lines of rotated cells and connected to said second line of rotated cells at a fourth common cell and connected to said third line of rotated cells at a fifth common cell.

7. The conservative quantum-dot cellular automata device of the claim 1, further comprising:
said fifth line of normal cells arranged substantially orthogonal to said third line of rotated cells and connected to said third line of rotated cells at a sixth common cell.

8. A method of transferring information in a conservative quantum-dot cellular automata device, said method comprising:
applying a first input state to a first line of rotated cells;
applying a second input state to a second line of rotated cells arranged substantially parallel to said first line of rotated cells;
applying a third input state to a third line of rotated cell arranged substantially parallel to said first line of rotated cells and said second line or rotated cells;
transferring said first input state to a first line of normal cells, said first line of normal cells arranged substantially orthogonal to said first line of rotated cells, said transferring controlled by said first clock;
transferring said second input state to a second line of normal cells, said second line of normal cells arranged substantially orthogonal to said second line of rotated cells, said transferring controlled by said first clock;
transferring said third input state to a third line of normal cells, said third line of normal cells arranged substantially orthogonal to said third line of rotated cells, said transferring controlled by said first clock;
transferring the inversion of said first input state to a fourth line of normal cells, said fourth line of normal cells arranged substantially orthogonal to said first line of rotated cells, said transferring controlled by said first clock;
transferring said second input state to a fifth line of normal cells, said fifth line of normal cells arranged substantially orthogonal to said second line of rotated cells, said transferring controlled by said first clock;
transferring said third input state to a sixth line of normal cells, said sixth line of normal cells arranged substantially orthogonal to said third line of rotated cells said, transferring controlled by said first clock;
transferring said first input state to a seventh line of normal cells, said seventh line of normal cells arranged substantially orthogonal to said first line of rotated cells, said transferring controlled by said first clock;
logically determining a majority of said first input state, said second input state, and said third input state using a first majority voter positioned adjacent to said first line of normal cells, said second line of normal cells, and said third line of normal cells, wherein said first majority voter is controlled by a second clock; and
logically determining a majority of the inversion of said first input state, said second input state, and said third input state using a second majority voter positioned adjacent to said fourth line of normal cells, said fifth line of normal cells, and said sixth line of normal cells, wherein said second majority voter is controlled by said second clock.

9. The method of claim 8, further comprising:
expressing said majority of said first input state, said second input state, and said third input state at an output region, said output region positioned adjacent to said first majority voter.

10. The method claim 8, further comprising:
expressing said majority of the inversion of said first input state, said second input state, and said third input state at an output region, said output region positioned adjacent to said second majority voter.

11. The method of claim 8, further comprising:
expressing said first input state at an output region, output region positioned adjacent to seventh line of normal cells.

12. A conservative quantum-dot cellular automata device, comprising:
a first circuit input controlled by a first clock;
a second circuit input controlled by said first clock;
a third circuit input controlled by said first clock;
an inverter having an input connected to said first circuit input and an output;
a first majority voter having a first input connected to the output of said inverter, a second input connected to said second circuit input, and a third input connected to said third circuit input, said first majority voter controlled by a second clock; and
a second majority voter having a first input connected to said first circuit input, a second input connected to said second circuit input, and a third input connected to said third circuit input, said second majority voter controlled by said second clock.

13. A method of transferring information in a conservative quantum-dot cellular automata device, said method comprising:
applying a first input state to a first circuit input controlled by a first clock;
applying a second input state to a second circuit input controlled by said first clock;
applying a third input state to a third circuit input controlled by said first clock;
inverting the first input state using an inverter to create an inverted first input state;
logically determining a majority of said inverted first input state, said second input state, and said third input state using a first majority voter connected to said inverter, said second circuit input, and said third circuit input, wherein said first majority voter is controlled by a second clock; and logically determining a majority of said first input state, said second input state, and said third input state using a second majority voter connected to said first circuit input, said second circuit input, and said third circuit input, wherein said second majority voter is controlled by said second clock.

* * * * *